US006993193B2

(12) United States Patent
Smith

(10) Patent No.: US 6,993,193 B2
(45) Date of Patent: Jan. 31, 2006

(54) METHOD AND SYSTEM OF OBJECT CLASSIFICATION EMPLOYING DIMENSION REDUCTION

(75) Inventor: David R. Smith, San Jose, CA (US)

(73) Assignee: Agilent Technologies, Inc., Palo Alto, CA (US)

( * ) Notice: Subject to any disclaimer, the term of this patent is extended or adjusted under 35 U.S.C. 154(b) by 642 days.

(21) Appl. No.: 10/106,435

(22) Filed: Mar. 26, 2002

(65) Prior Publication Data

US 2003/0185436 A1    Oct. 2, 2003

(51) Int. Cl.
G06K 9/62    (2006.01)
(52) U.S. Cl. .............. 382/224; 382/159; 382/225; 382/228; 382/150
(58) Field of Classification Search ............... 382/141, 382/150, 155, 159, 224, 225, 228, 190; 700/47, 700/48
See application file for complete search history.

(56) References Cited

U.S. PATENT DOCUMENTS 5,361,628 A * 11/1994 Marko et al. ............... 73/116
6,560,568 B1 * 5/2003 Singhal et al. ............. 703/2

OTHER PUBLICATIONS

Goodman et al., Feature Extraction Algorithms for Pattern Classification, Sep. 1999, Artificial Neural Networks,IEEE 1999 Conference Publication No. 470, pp. 738-742.*
Jimenez et al., Projection Pursuit in High Dimensional Data Reduction: Initial Conditions, Feature Selection and the Assumptio of Normality, 1995, IEEE Publication, pp. 401-406.*
Algorithm for Detecting Solder Joint Defects Using K-L Transformation and Fourier Transformation, Mar. 1, 1995, IBM Technical Disclosure Bulletin, vol. No. 38, issue No. 3.*
Diamantaras et al., An Unsupervised Neural Model for Oriented Principal Component Extraction, 1991, IEE Publication, pp. 1049-1052.*
Duda and Hart, Pattern Classification and Scene Analysis, John Wiley and Sons, 1973, pp. 213-217.
Keinosuke Fukunaga, Introduction to Statistical Pattern Recognition, 2nd ed., Academic Press, 1993, pp. 28 and 416.
Golub and Van Loan, Matrix Computations, 2nd edition, Johns Hopkins University Press, 1993, pp. 427-437.
Joseph B. Kruskal, "Toward a Practical Method Which Helps Uncover . . . ", in Statistical Computation, R. Milton and J. Nelder, eds., Academic Press, 1969, pp. 427-440.

(Continued)

Primary Examiner—Bhavesh M. Mehta
Assistant Examiner—John Strege

(57) ABSTRACT

A method and system of object classification uses measurements for a training set of objects to classify an unknown object as being a member in one of several classes of the training set. The classes are defined by features of the training set, the objects of which have known class memberships. The method comprises performing principal component analysis on the training set measurements to discard features that have negligible information regarding class membership, conducting projection pursuit on the remaining training set measurements to accentuate differences between the classes, estimating a distribution of each accentuated class in the training set, and evaluating measurements of the unknown object to determine the membership of the unknown object in one of the accentuated classes. The system implements the method in a computer program stored in computer memory.

25 Claims, 4 Drawing Sheets

OTHER PUBLICATIONS

Luis Jimienez and David Landgrebe, "High Dimensional Reduction Via Projection Pursuit", IEEE IGARSS '94, Aug. 8-12, 1994. pp. 1145-1147.

Charles W. Therrien, Decision Estimation and Classification, John Wiley and Sons, New York, 1989, pp. 169-185.

Neil Gershenfeld, The Nature of Mathematical Modeling, Cambridge University Press (UK), 1999, pp. 174-185.

Charles W. Therrien, "Feature Extraction and Nonlinear Mapping", in Decision Estimation and Classification, John Wiley & Sons, 1989, pp. 71-78.

Jerome H. Friedman and John W. Tukey, "A Projection Pursuit Algorithm for Exploratory Data Analysis", IEEE Trans on Computers, vol. c-23, No. 9, Sep. 1974, pp. 881-890.

* cited by examiner

METHOD AND SYSTEM OF OBJECT CLASSIFICATION EMPLOYING DIMENSION REDUCTION

TECHNICAL FIELD

The invention relates to inspection and classification of objects using inspection systems. In particular, the invention relates to object classification using multivariate estimation.

BACKGROUND ART

An important practical problem in automated inspection systems is a classification, categorization, or identification of an object. Generally, an automated inspection system classifies objects based on measurements taken of the object being inspected. Related to this problem is the challenge of identifying an object based on measurements taken from an image of the object. The latter of these is a problem common to both inspection systems and more general-purpose image processing systems. In simple terms, the objective or goal of the classification task performed by such systems is to use the measurements and/or combinations of the measurements of the object to determine the object's membership in one or more possible groups or classes of objects. For example, in a manufacturing inspection system, a customary goal is to determine whether a given object of manufacture is either 'good' or 'bad' (i.e. belongs to a class of good objects or a class of bad objects). Typically, measurements of the inspected object are compared either to measurements taken of known good and bad objects or to specifications defining good and bad objects and a determination of class membership (good or bad) is made.

Unfortunately, due to statistical variations in measured characteristics of the inspected objects and/or statistical errors in the measurements themselves, the determination of class membership usually is not deterministic but instead is made according to probability theory. In other words, the determination establishes a likelihood or probability that a given object is a member of a particular class or category. Moreover, in many practical cases no single measurement can be used to reliably perform the categorization. Instead, multiple measurements are often required. The measurements and/or combinations of the measurements can be thought of as 'features' of the object. The object features are compared to sets of representative features for each of the possible groups and a determination is made based on an aggregate of the comparison results. Thus, the classification problem is more correctly termed an estimation problem in which the probability of membership of the object in a particular group or class is estimated based on the features of the object. The branch of statistics that deals with the problem of classifying or estimating class membership based on features derived from multiple measurements is known as multivariate analysis or multivariate estimation.

For example, consider the automatic inspection of solder joints using an imaging system such as an X-ray laminography system. The laminography system produces images of the solder joints on a printed circuit board (PCB) being inspected. A computer then processes the images and attempts to determine if the solder joints are 'good joints' or 'bad joints'. The goal is to correctly detect bad solder joints so that they can be flagged and not end up in a finished PCB. A simultaneous goal to that of detecting bad joints is to avoid incorrectly labeling good joints as bad joints since this would cause unwarranted increases in printed circuit board (PCB) production costs.

The classification process in such inspection systems is often based on features extracted from images of the solder joints. The features of each solder joint typically number in the tens of features per solder joint inspected and include, but are not limited to, such things as the estimated volume of solder in a heel of the joint and estimated volume of solder in a toe of the joint. Since experience has shown that no single measurement or feature correlates sufficiently well with whether a solder joint is good or bad, it is necessary to consider a number of features as an aggregate to distinguish good joints from bad joints. It is hoped that if a solder joint is bad, it will clearly fail or be classified as bad for at least one feature.

As discussed above, the analysis and decision-making is complicated by the necessity of using multiple features in the solder joint classification. In general, dividing lines between statistical distributions of features representing good and bad joints are drawn liberally, favoring type II errors, over type I errors. In type II errors, a bad joint is erroneously classified as a good joint while with type I errors, a good joint is erroneously classified as a bad joint. Thus, for a solder joint to be categorized as a bad joint, a typical criterion is that the solder joint must clearly fail with respect to at least one of the measurements or features. Fuzzy logic and expert systems approaches additionally can allow for the possibility of flagging a bad solder joint because several features may show it to be questionable. Even with such techniques, only an examination of the multivariate statistical distribution will reveal a structure of the distribution with sufficient diagnostic power to make a reliable class membership determination.

The general problem of estimating a multivariate probability density function of a set of features representing an object or class of objects is at best difficult and becomes more problematic as the number of dimensions (i.e., variables or features) increases. As the number of dimensions increases, the volume of the feature space increases exponentially. Increases in feature space volume make it increasingly difficult to estimate the local probability density, especially based on a limited sample population of objects with known class membership. In practice, there are often insufficient sample points nearby to a given location in the measurement space with which to make a reliable local estimate. Another way to look at the situation is that the number of parameters required to specify an arbitrary multivariate distribution rises exponentially with dimensionality.

Often the problem of estimating the probability density function can be made more tractable by modeling the density function as a mixture or combination of one or more relatively simple distribution functions. For example, one of the simplest, and consequently mostly widely used, multivariate distributions is the multivariate Gaussian. However, even with the use of one or more simple distribution functions, the number of parameters can still be a concern. The multivariate Gaussian, for instance, contains $n(n+3)/2$ parameters, where n is the dimensionality of the feature space. While the increase in feature space dimensionality for the Gaussian is less than exponential, there still would be 350 parameters required for a single Gaussian of dimensionality $n=25$. In turn, each class (e.g. good and bad) generally needs at least as many samples as there are parameters, and in most cases, many times more samples to make a reliable estimate. Moreover, since bad components are generally rare, it can be difficult to obtain a large representative sample set that adequately encompasses the probable failure modes. Furthermore, correlations among the measurements that contain errors can and do cause the estimation process to be computationally ill-conditioned. Ill-conditioning leads to errors in the estimation and in the worst cases, complete failure of the estimation process.

Accordingly, it would be advantageous to have a method for classifying unknown objects as being a member of a class, where the method utilizes multiple features derived from measurements of known objects to define classes. Furthermore, it would desirable for such a method to employ an approach for reducing the dimensionality of the feature space that preserves the important or significant features, and by extension, the diagnostic power of the feature space. Such a method would solve a long-standing need in the area of multivariate estimation as it is used in image processing and automated inspection.

SUMMARY OF THE INVENTION

The present invention classifies an unknown object using a training set of known objects and employing multivariate estimation. The present invention minimizes the problems associated with large dimensional feature spaces by applying a novel dimension reduction to the feature data from the training set and the unknown object. The novel dimension reduction approach of the present invention both reduces the dimensionality of the feature space while revealing the apparent or observed differences between classes in the training set, thereby enhancing the accuracy of the classification of unknown objects.

In an aspect of the invention, a method is provided for classifying an unknown object as being a member of one of a plurality of classes, the classes being defined by features that represent linear combinations of data values derived from measurements taken for known objects in a training set of objects. The method comprises performing principal component analysis of the data values to discard features that have negligible information regarding class membership, conducting projection pursuit on the training set data values to accentuate differences between the classes, estimating a distribution of each of the classes represented in the training set, and evaluating features of an unknown object to determine membership in one of the classes. The method optionally further comprises normalizing and centralizing the training set data values of the features. Normalizing and centralizing is preferred. In some embodiments, the optional normalizing and centralizing comprises spherizing the data values.

In another aspect of the invention, a system for classifying an unknown object as being a member of one of a plurality of classes using measured data for the unknown object and measured data for a training set of known objects is provided. The system comprises a computer that performs numerical processing, a memory for storing data and intermediate results, and a computer program stored in the memory. The computer program comprises instructions that implement performing principal component analysis of the measured data for the training set to discard features that have negligible information regarding class membership, conducting projection pursuit on the measured data of the training set to concentrate differences between the classes into a lower-dimensional space, estimating a distribution of each of the classes represented in the training set, and evaluating features of the unknown object to determine membership in one of the classes. The computer program also comprises instructions that implement optional normalization and centralization of the measured data of the training set. Preferably, the computer program implements the method of the present invention.

The present invention advantageously reduces the dimensionality of the multivariate estimation problem. Moreover, the dimensionality reduction accomplished by sequentially performing principal component analysis followed by projection pursuit accentuates the difference between the between classes represented in the training set. The combination of dimensionality reduction and difference accentuation results in improved classification of unknown objects. Certain embodiments of the present invention have other advantages in addition to and in lieu of the advantages described hereinabove. These and other features and advantages of the invention are detailed below with reference to the following drawings.

BRIEF DESCRIPTION OF THE DRAWINGS

The various features and advantages of the present invention may be more readily understood with reference to the following detailed description taken in conjunction with the accompanying drawings, where like reference numerals designate like structural elements, and in which.

MODES FOR CARRYING OUT THE INVENTION

Figure 1:
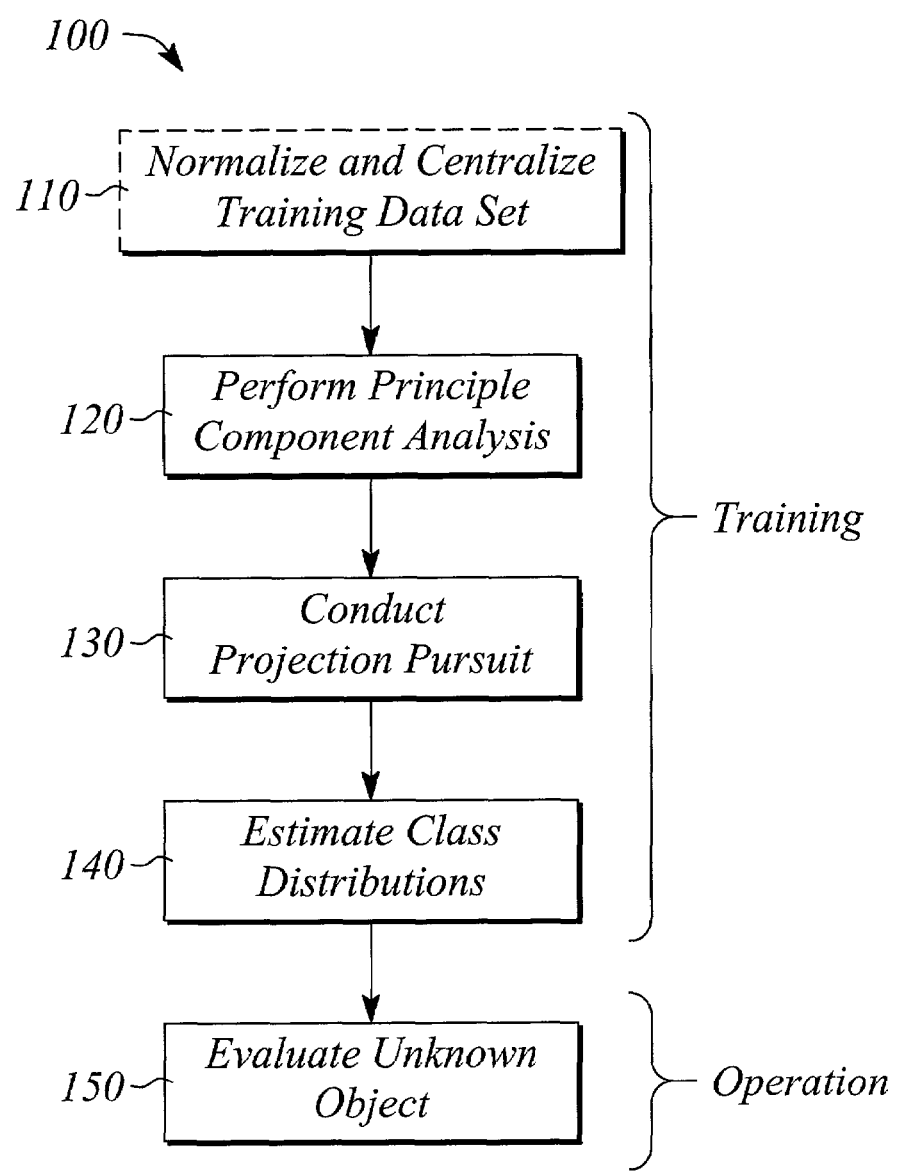
FIG. 1 illustrates a flow chart of a method of classifying an object with feature space dimension reduction according to an embodiment of the present invention.

The present invention provides object classification or identification using multivariate estimation. In particular, a method of object classification of the present invention uses measurements of an unknown object and/or measurements extracted from an image of the unknown object. The measurements and linear combinations of the measurements are features of the object being classified. The features are used to classify the unknown object as being a member in one of several classes or categories of objects. The classes are defined by features in a training set developed by the method from measurements of known objects. A system of the present invention preferably implements the method. The method and system are useful in a wide range of applications, including but not limited to, computer vision, automated inspection systems, and related image processing.

The present invention employs a novel measurement or feature space dimension reduction. The method reduces the dimension of the feature space and optimizes the statistical distribution of data used to classify an object as being a member of one of several classes of objects. Moreover, the method of the present invention accomplishes the dimension reduction in a manner that advantageously preserves important or significant features of the feature space and discards unimportant features. Essentially, the method of classification using dimension reduction facilitates multivariate estimation of class membership by minimizing the dimension of the estimation problem such that the estimation is performed on only the most significant features.

For the purposes of the discussion herein, the term 'feature space' refers to a multidimensional space or volume that contains all of the measurement data that can result from a set of measurements taken for a set of objects being classified. For example, if five physical measurements, such as length, width, color, density, and volume, were taken, the feature space could be a 5-dimensional space having one axis for each feature. Within the feature space, individual measurements are represented as points having locations defined by coordinates associated with a particular coordinate system of the feature space. Alternatively, points in this space may be specified relative to a different or transformed coordinate system. A transformed coordinate system is one that is shifted, stretched, and/or rotated relative to the original coordinate system. Unit vectors along the axes of the new transformed coordinate system form a new basis of the measurement space. In addition, the feature space can contain linear combinations of measurements. The set of measurements taken for a given object and their linear combinations are said to be in the feature space and the feature space spans the total range of possible features. Measurements are either actual measurements of physical parameters associated with the object or derived parameters that are inferred from physical measurements or other sources.

The method of classification uses a so-called training set of measurement or feature data taken for a set of known objects. A known object is one whose group or class membership is known a priori. Once established, the training data set serves as a basis or template against which the features of an unknown object are compared in an attempt to classify the object. The training set establishes the classes to which the unknown object is assigned. For example, in automated solder joint inspection there may be two classes, 'good solder joints' and 'bad solder joints'. The training set contains examples of both good joints and bad joints and measurements of these known good joints and known bad joints are used to create the training set of feature data. Preferably, the training set contains examples of objects that span the classes or at least represent a good statistical sample of the classes. Determining a quantity of objects that make up a good statistical sample is case specific and one skilled in the art would readily be able to determine the quantity without undue experimentation.

The number of classes used to classify an object in accordance with the invention depends on a specific classification situation. For simplicity and to facilitate the discussion that follows, the present invention will be described with reference to an example having only two groups or classes to which a measured object can be assigned. Thus, using this example, the multivariate estimation involves classifying a measured object as either being a member of a first class or a second class. For instance, the first class may be the class of 'good' objects and the second class may be the class of 'bad' objects (e.g., good solder joints and bad solder joints). The example using only two classes herein is not intended to limit the scope of the invention in any way. One skilled in the art can readily extend the discussion that follows to situations where there are more than two classes, such as the classes needed to define the different types of defects in bad solder joints, and still be within the scope of the present invention.

With the simplifying example of two classes, 'good' and 'bad', let $n_g$ be the number of good objects and let $n_b$ be the number of bad objects in a training set. Furthermore, let G be a matrix (or table) having $n_g$ rows and n columns, where n is the number of features for each object or equivalently, the dimensionality of the feature space. Therefore, the elements $G_{i,j}$ of the matrix G represent the feature data for the $n_g$ good objects of the training set, where $i=1, \ldots, n_g$ and $j=1, \ldots, n$. Furthermore, let B be a matrix having $n_b$ rows and n columns. The elements $B_{k,j}$ of the matrix B are filled with the feature data for the $n_b$ bad objects of the training set, where $k=1, \ldots, n_b$. Furthermore, let a superscript in angle brackets represent a column of a matrix (e.g., $B^{<1>}$ means column number one of the matrix B). In other words, the j-th column of matrix G (e.g., $G^{<j>}$) holds the feature data from a j-th feature of known good objects, while the j-th column of matrix B (e.g., $B^{<j>}$) holds the feature data for a j-th feature of known bad objects. The matrices G and B then have the form of equations (1) and (2), respectively.

$$G = \begin{bmatrix} G_{1,1} & G_{1,2} & \cdots & G_{1,n} \\ G_{2,1} & G_{2,2} & \cdots & G_{2,n} \\ \vdots & \vdots & \ddots & \vdots \\ G_{n_g,1} & G_{n_g,2} & \cdots & G_{n_g,n} \end{bmatrix} \quad (1)$$

$$B = \begin{bmatrix} B_{1,1} & B_{1,2} & \cdots & B_{1,n} \\ B_{2,1} & B_{2,2} & \cdots & B_{2,n} \\ \vdots & \vdots & \ddots & \vdots \\ B_{n_b,1} & B_{n_b,2} & \cdots & B_{n_b,n} \end{bmatrix} \quad (2)$$

Thus, if a second feature of a third good object was data from a measurement of volume, for example, the element $G_{3,2}$ of the matrix G would be the measured volume for that third object. Likewise, the corresponding measured volume feature data of a second bad object would appear as the element $B_{2,2}$ in the matrix B for this example. Moreover, for the case of more than two classes there would simply be more matrices.

A flow chart of a method 100 of classification is illustrated in FIG. 1. The method 100 of classification comprises optionally normalizing and centralizing 110 the training set data contained in the matrices G and B. Ideally, normalizing and centralizing 110 involves scaling the various feature data, such that any expected measurement noise is approximately the same magnitude for each of the different features. In practice, one skilled in the art should be able to determine an appropriate relative scaling for a particular classification problem. The optional normalizing and centralizing 110 is illustrated as a dashed line box in FIG. 1.

The optional normalizing and centralizing 110 is preferred in most applications of the method 100. More preferably, normalizing and centralizing 110 comprises spherizing the feature data. Spherizing transforms the matrices G and B into new spherized matrices G' and B' by first calculating the mean value and the standard deviation for each column (i.e., feature) and then subtracting the column-wise mean values from each element of each column of the matrices G and B, followed by dividing each element of a column by the column-wise standard deviation. Spherizing can be described by equations (3) and (4)

$$G'_{i,j} = \frac{(G_{i,j} - \text{mean} <j>)}{sdev <j>} \, \forall \, i \in \{1, \ldots, m_g\} \text{ and } j \in \{1, \ldots, n\} \quad (3)$$

-continued $$B'_{k,j} = \frac{(B_{k,j} - \text{mean} <j>)}{sdev <j>} \forall\, i \in \{1, \ldots, m_b\} \text{ and } j \in \{1, \ldots, n\} \quad (4)$$

where the term 'mean <j>' is the mean of the j-th column and the term 'sdev <j>' refers to the standard deviation of the j-th column. Preferably, the mean is the arithmetic mean or average of the elements that make up the j-th column of the matrix G (e.g., mean <j> is defined as mean ($G^{<j>}$)). Alternatively, the mean <j> can be the mean of the elements from the j-th column of both of the matrices G and B. Similarly, the standard deviation is preferably taken for the elements that make up the j-th column of the matrix G. As with the mean, alternatively the standard deviation may be based on the elements from the j-th column of both matrices G and B. The mean and standard deviation for each column (i.e., for each feature) are retained for later use in the method 100 of classifying the unknown object of a preferred embodiment, as described below for evaluating the unknown object 150.

Spherizing helps to deal with features that are incommensurate with each other. The effect of the spherizing is to normalize the data in the columns of the matrices G' and B'. The normalization is useful since the columns of the matrices G and B can represent features with very different numerical ranges. For example, a first column of the matrices $G^{<1>}$ and $B^{<1>}$ might be a length measurement while a second column $G^{<2>}$ and $B^{<2>}$ might be a volume measurement. In general, the numerical values of length measurements will have no relationship to numerical values associated with volume measurements.

The method 100 of classification further comprises performing 120 principal component analysis (PCA) on the training set data. In the preferred embodiment, PCA is performed on the training set data contained in the combined spherized matrices G' and B'. Performing 120 PCA transforms the feature space represented by the combined spherized matrices G' and B' by rotating the feature space coordinate system so that the data are represented by a new set of features that are linearly uncorrelated with each other. In other words, if the original data exhibited some strong correlations between features, then some of the resulting new features will have variances that are very small compared to others.

In addition, performing 120 PCA yields a measure or gauge of the statistical variance within each feature. The features with negligible variance can be discarded without adversely affecting the object classification, since these features provide little useful information regarding the differences between the classes of objects. Moreover, by discarding features or equivalently, transformed measurement data, which provide little or no information, the dimensionality of the multivariate problem is reduced. Thus, the result of performing 120 PCA is a first reduction of the dimensionality of the problem.

Performing 120 PCA considers all of the training set as a group, regardless of class (e.g., good, bad). PCA produces a set of mutually orthogonal basis vectors spanning the feature space. Projecting the training set feature data onto the basis vectors produces a new set of modified features (also called components) that are uncorrelated. Moreover, as mentioned above, PCA produces the variance of the features. Features with negligible variance can be dropped from further processing, thereby yielding a reduction of the feature space dimension. The lowered dimensionality of the feature space enhances numerical stability of later steps and helps to avoid the so-called 'curse' of dimensionality.

In another embodiment, performing 120 PCA can be limited to data from only one selected class (e.g., limited to data from known good objects). In this embodiment, the rotations performed on the selected class to decorrelate the features of the selected class are simply repeated on the data from the other classes of known objects. For example, in the case of good and bad solder joints, performing 120 PCA is done first on data from known good solder joints in the training set. The rotations of performing 120 then are applied to the data from known bad solder joints of the training set.

A number of approaches to accomplish performing 120 PCA are known in the art. Discussions of PCA can be found in textbooks such as Duda and Hart, *Pattern Classification and Scene Analysis*, John Wiley and Sons, 1973, pp. 214, and Keinosuke Fukunaga, *Statistical Pattern Recognition*, $2^{nd}$ ed., Academic Press, 1990, pp. 28 and 416f, both of which are incorporated by reference herein. In a preferred embodiment of the method 100 of classification, a singular value decomposition (SVD) approach is used. One skilled in the art will readily recognize other methods of performing 120 PCA, all of which are within the scope of the present invention.

Figure 2:
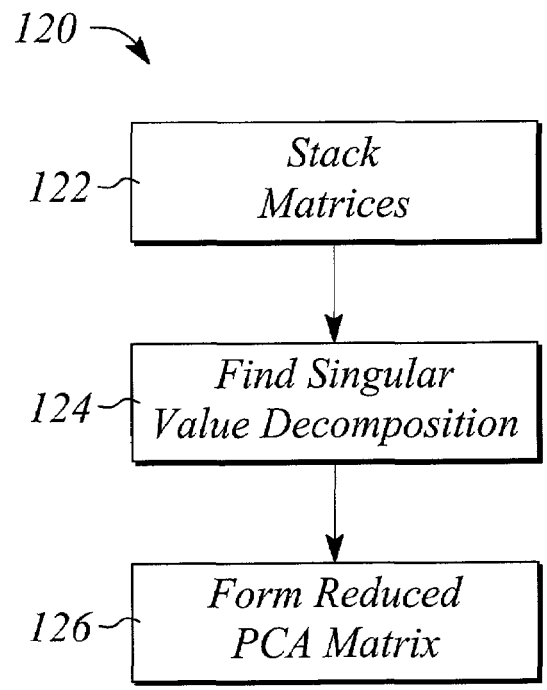
FIG. 2 illustrates a flow chart of an embodiment of performing principal component analysis of the method of classifying illustrated in FIG. 1.

FIG. 2 illustrates a flow chart of a preferred embodiment of performing 120 PCA using SVD. According to the preferred embodiment, performing 120 PCA using SVD comprises stacking 122 the spherized matrices G' and B' on top of one another to form a matrix C. The new matrix C has $n_g+n_b$ rows and n columns, the first $n_g$ being rows from the matrix G' and the last $n_b$ being the rows from the matrix B'. Thus, matrix C is defined by equation (5)

$$C = \begin{bmatrix} G' \\ B' \end{bmatrix} \quad (5)$$

where an upper submatrix of the matrix C is the matrix G' and a lower submatrix of the matrix C is the matrix B'.

Performing 120 PCA of the preferred embodiment further comprises finding 124 the SVD of the matrix C. The SVD of the matrix C is given by equation (6)

$$C = USV^T \quad (6)$$

where U is an orthogonal matrix having ($n_g+n_b$) rows and n columns, V is an orthogonal matrix having n rows and n columns, and S is a non-negative diagonal matrix having n rows and n columns. The diagonal elements $\delta_{j,j}$ of the matrix S are called the singular values and are ordered in non-increasing manner. The matrix V is the principal component matrix, the columns of which are the principal component vectors or directions or features. The superscript 'T' indicates the matrix transpose. Algorithms for finding the SVD of a matrix C are well known in the art and can be found in many commonly available textbooks and computer software packages dealing with matrix computations without undue experimentation. An algorithm for SVD, as well as several other matrix orthogonalization methodologies applicable to performing 120 PCA, can be found in Golub and Van Loan, *Matrix Computations*, $2^{nd}$ edition, Johns Hopkins University Press, 1993, incorporated by reference herein.

Performing 120 PCA using SVD further comprises forming 126 a reduced principal component matrix V'. The reduced principal component matrix V' is formed by removing or deleting columns corresponding to the negligible singular values $\zeta_{j,j}$ from the principal component matrix V. A singular value $\zeta_{j,j}$ is considered negligible if it is much smaller than a maximum singular value $\delta_{1,1}$. Thus, the discarded columns of the matrix V are those corresponding to the columns of the matrix S for which $\zeta_{j,j} \ll \zeta_{1,1}$. For the purposes of discussion herein, $\zeta_{j,j} \ll \zeta_{1,1}$, if $\zeta_{j,j} \le \epsilon \cdot \zeta_{1,1}$, where a typical value for $\epsilon$ is approximately $10^{-6}$. However, a specific value for $\epsilon$ is not critical and depends heavily on a particular application of method 100. One of ordinary skill in the art can easily determine a value for $\epsilon$ for a given situation without undue experimentation.

Although not illustrated in FIG. 2, performing 120 PCA using SVD optionally further comprises forming a modified matrix C', as described by equation (7)

$$C' = CV' \qquad (7)$$

Forming the modified matrix C' is optional since the reduced principal component matrix V' contains all of the information necessary to form the modified matrix as is evident from equation (7). Thus, the reduced principal component matrix V' effectively 'captures' the effect of performing 120 PCA.

It is known in the art that the magnitude of the singular value $\zeta_{j,j}$ is often related to the amount of information associated with the j-th column of the matrix C. Thus, discarding columns of the principal component matrix V that have negligible singular values $\zeta_{j,j}$ preserves most of the information or at least preserves the most significant information regarding the differences between the classes (e.g., differences between good and bad objects) as represented by the original matrix C. Moreover, since the j-th column of the matrix C comprises feature data from the j-th feature on the good and bad objects of the training set, the effect of forming 126 is to identify and eliminate the features that provide the least amount of information regarding whether an object is a member of the class of good objects or the class of bad objects. Furthermore, the reduced principal component matrix V' and optional modified matrix C' are of lower dimension than the original V and C matrices.

The modified matrix C' optionally produced by performing 120 PCA advantageously contains submatrices associated with the various classes represented by the training set, as did the matrix C. Moreover, the relative locations of the submatrices that make up the modified matrix C' are preserved by performing 120 PCA. Thus, for the example of good and bad classes being considered herein, the modified matrix C' has a submatrix G" that corresponds to the good objects from the training set and a submatrix B" that corresponds to the bad objects of the training set. Since the matrix C was formed by stacking the matrix G' on top of the matrix B', as given by equation (5), the modified matrix C' has the submatrix G" stacked on top of the submatrix B", as given by equation (8).

$$C' = \begin{bmatrix} G'' \\ B'' \end{bmatrix} \qquad (8)$$

The reduced principal component matrix V' is similarly separable into independent portions, one portion for each of the classes represented by the matrix C.

Heuristically speaking, performing 120 PCA orients the training set data contained in the modified matrix C' such that a first dimension of the matrix achieves a maximum variance. Likewise, a second dimension achieves a maximum variance within a subspace orthogonal to the first dimension, etc. As used herein, the 'dimensions' of a matrix are equivalent to the columns of a matrix. The achieved maximum variance usually tends to concentrate discrimination power of the modified matrix C' in the lower-numbered dimensions, partly because the 'cloud of data points' will tend to be elongated along the direction separating the means of the good and bad classes. The same can be said for the principal component matrix V' since there is a direct relationship between the modified matrix C' and the principal component matrix V', as given by equation (7).

Referring back to FIG. 1, the method 100 of classification further comprises conducting 130 supervised projection pursuit preferably on the reduced principal component matrix V', or alternatively, on the optional modified matrix C'. Projection Pursuit (PP) is a multivariate analysis methodology that seeks to capture and/or concentrate class discrimination power in a smaller number of dimensions than exists in a data set prior to applying PP. In essence, PP attempts to find a projection of the data onto a lower dimensional hyperplane such that the projection optimizes or maximizes an objective function. The objective function measures or gauges the statistical separation between the classes of objects represented by the data being projected. In conventional applications, PP is used to 'discover' classes with a data set where the classes are unknown a priori. A discussion of conventional applications of PP can be found in Kruskal, "Toward a Practical Method Which Helps Uncover the Structure of a Set of Multivariate Observations by Finding the Linear Transformation Which Optimizes a New 'Index of Condensation'," in *Statistical Computation*, R. Milton and J. Nelder, eds., Academic Press, 1969, pp. 427–440, and in Jimienez and Landgrebe, "High Dimensional Reduction Via Projection Pursuit", TR-ECE 96-5, Purdue, 1995, both of which are incorporated by reference herein. In the method 100, PP is being used to help differentiate classes in a data set, the classes being known a priori. Thus, conducting 130 PP of method 100 is termed conducting 130 'supervised' PP.

According to the present invention, conducting 130 supervised Projection Pursuit seeks to improve the discrimination power of the reduced principal component matrix V' and/or the optional modified matrix C' of performing 120 PCA. Whereas performing 120 PCA treats all training set data points as a single 'population' regardless of class membership, conducting 130 PP treats the sets of populations of data points corresponding to the good and bad classes of the training set separately. In essence, conducting 130 PP looks for the 'directions' that best separate the classes. In its basic form, supervised PP of the present invention employs an objective function, which gauges inter-class separability of the data points when projected into one dimension. The first dimension or axis of a matrix containing the data is optimized by rotating the first dimension against each of the other dimensions or axes in turn, thereby maximizing the objective or separation function each time. Thus, each rotation occurs in a 2-dimensional subspace of the matrix, and the optimization itself is carried out over only one variable (i.e., the rotation angle).

After the first axis has been optimized, the same procedure is carried out for the second axis. The second axis is optimized by rotations against the remaining higher-numbered axes. Thus, the second axis concentrates the discrimination power that remains in a subspace orthogonal to the first axis. The third axis can then be rotated against the higher-numbered axes to concentrate the discrimination power that remains in a residual subspace, and so on.

In addition, after the first axis is optimized against the second axis, further modification of either one by rotations against a third axis may reveal that some additional improvement can be made in the optimization of the first axis, by rotating the first axis again against the second axis. Therefore, the cycle of improvements can be repeated until further improvement is observed to be negligible.

Moreover, in a variant of supervised PP, the number of dimensions desired for the final statistical model may be pre-specified (typically 2 to 5). The objective function to be maximized may be a measure of the difference between two multivariate distributions within the target subspace. Each basis vector of the favored subspace is rotated in turn against the remaining, non-favored basis vectors. Thus, the innermost optimization is still a maximization of a 1-dimensional rotation angle.

In a preferred embodiment, conducting 130 PP rotates or transforms the reduced principal component matrix V' in such a way that when the data contained in the matrix is projected into a lower dimensional feature space, the statistical differences between the classes in the optional modified matrix C' are at least preserved and ideally enhanced (recall that C'=CV'). Thus, conducting 130 PP attempts to maximize an objective function that represents the separation between the classes within the modified matrix C' as represented by the features embodied in the reduced principal component matrix V'. Conducting 130 PP results in a projection of the data in the reduced principal component matrix V' onto a lower dimensional hyperplane, which accentuates the differences between the classes represented by the training set data. Conducting 130 PP can produce a rotated matrix C'" or equivalently rotated submatrices G'" and B'" using a version of equation (7).

More preferably, as mentioned hereinabove, the projection of conducting 130 PP is a projection from a 2-dimensional (2-D) space onto a 1-dimensional (1-D) space. Therefore, conducting 130 PP more preferably is performed iteratively in a pair-wise manner on vectors taken from the reduced principal component matrix V' where the vectors are defined as the columns of the reduced principal component matrix V'. In the projection from a 2-D to a 1-D space, the objective function must gauge the class separation in the 1-D space. In other words, conducting 130 PP attempts to find a projection vector that maximizes a 1-D objective function. The cumulative projection vector resulting from the iterative application of conducting 130 PP defines a multidimensional rotation of the data. Effectively, PP rotates the projection vector around in the high-dimensional space to find the direction that maximizes the objective function gauging statistical separation. Therefore, the objective-function maximization amounts to a search for a set of rotation directions, one direction for each pairing of vectors in the reduced principal component matrix V', that optimizes the statistical discrimination power between the classes.

Advantageously, due to the preferred projection of the data onto a 1-dimensional space, the statistics of the distributions of the classes in the reduced principal component matrix V' can be accurately and relatively easily computed. Once the maximizing vector is found, that direction can be removed from the data, and the process repeated to find the next best direction.

Figure 3:
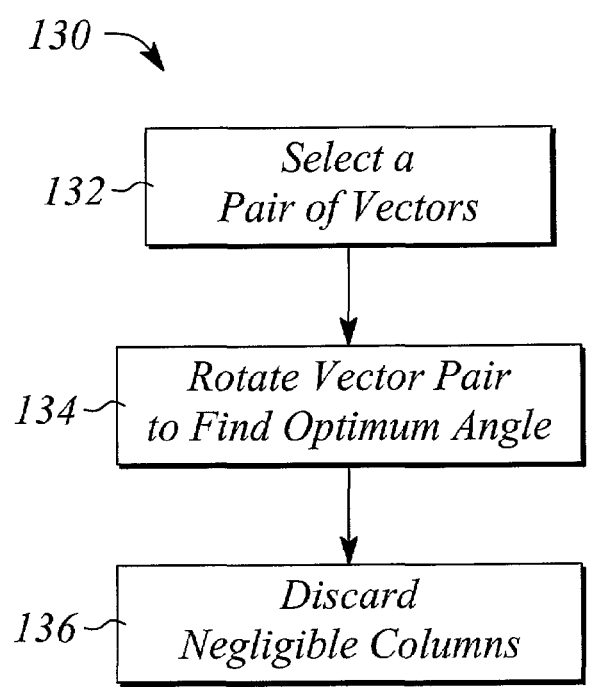
FIG. 3 illustrates a flow chart of an embodiment of conducting projection pursuit of the method of classifying illustrated in FIG. 1.

FIG. 3 illustrates a flow chart of conducting 130 projection pursuit (PP) according to a preferred embodiment. In the preferred embodiment, conducting 130 PP comprises selecting 132 a pair of vectors from the reduced principal component matrix V'. As defined herein, the vectors are columns of the reduced principal component matrix V'. Thus, selecting 132 comprises selecting a first vector $V'^{<p>}$ and a second vector $V'^{<q>}$, where p and q are integers that function as vector identifiers, and where $q \neq p$.

Conducting 130 PP further comprises rotating 134 the selected pair of vectors $V'^{<p>}$ and $V'^{<q>}$ find an optimum rotation angle $\theta$ for the pair of vectors. The optimum rotation angle $\theta$ is an angle that maximizes the objective function in the space of the lower-numbered vector. Selecting 132 and rotating 134 are repeated for different pairs of vectors in the reduced principal component matrix V' until diminishing returns indicate the maximum has been reached. One skilled in the art would be able to determine when the objective function was sufficiently maximized for a given application of the method 100 without undue experimentation.

For example, cyclic pairing with pairs of vectors can be used in conducting 130 PP of the present invention. Selecting 132 with cyclic pairing begins by selecting the first column $V'^{<1>}$ of the reduced principal component matrix V' as a first vector of the pair of vectors (i.e., p=1) and the second column $V'^{<2>}$ of the reduced principal component matrix V' as a second vector of the pair of vectors (i.e., q=2). On a next iteration, the third column $V'^{<3>}$ is used as the second vector (i.e.,p=1; q=3), and so on, until the n-th column $V'^{<n>}$ is used as the second vector (i.e.,p=1; q=n). On yet a next iteration, the second column $V'^{<2>}$ is used as the first vector and the second vector is successively selected to be the third column $V'^{<3>}$ through the n-th column $V'^{<n>}$ (i.e.,p=2; q=3 . . . n). On yet a next iteration, the third column $V'^{<3>}$ is selected as the first vector, and so on. Thus, the first column $V'^{<1>}$ is rotated against the second through the n-th columns (i.e., $V'^{<2>}$ through $V'^{<n>}$), the second column $V'^{<2>}$ is rotated against the third through the n-th columns (i.e., $V'^{<3>}$ through $V'^{<n>}$), and so on. In some cases, a sufficiently maximized result will be obtained before using the (n−1)-th column $V'^{<n-1>}$ as the first vector. In other cases, several passes or cycles of pair-wise selecting may be necessary.

While the preferred selection 132 using cyclic pairing does not guarantee that a globally optimal set of optimum angles $\theta$ will be found, experience has shown that it works quite well in many practical cases. Moreover, conducting 130 PP advantageously allows the choice of when to halt the repetition of selecting 132 and rotating 134 to be determined on a case-by-case basis by one skilled in the art to minimize unnecessary time spent conducting 130 PP.

The implementation of rotating 134 the selected vectors of the reduced principal component matrix V' uses a Givens rotation. The Givens rotation is well known in the art of matrix computation and is described in detail in Golub and Van Loan, cited hereinabove.

Conducting 130 PP using Givens rotations comprises selecting 132 a pair of vectors $V'^{<p>}$ and $V'^{<q>}$ and designating the selected vectors as vector $\alpha$ and vector $\beta$, respectively. A quantity $Q(\phi)$ is then defined, as given be equations (9a) and (9b).

$$Q(\phi) = f(m_g \zeta(\phi), \zeta(\phi)^T C_g \zeta(\phi), m_b \zeta(\phi), \zeta(\phi)^T C_b \zeta(\phi)) \qquad (9a)$$

where $$\zeta(\phi) = \alpha \cos(\phi) - \beta \sin(\phi) \qquad (9b)$$

and where the function $f(\cdot)$ is the objective function and the superscript 'T' indicates the transpose of a vector or a matrix. As used herein, objective function $f(\cdot)$ is a function of $m_g$, $m_b$, $C_g$, $C_b$ and $\zeta$. The vector $m_g$ is a vector mean of the training set data representing the 'good' class and the vector $m_b$ is a vector mean of the training set data representing 'bad' class. The quantities $C_g$ and $C_b$ are covariance matrices of the training set data representing the good and bad classes, respectively. Note that, as presented in equation (9a), the statistics of the data in the reduced principal components matrix V' (or the C' matrix) are being rotated instead of the data itself. The statistics are advantageously smaller than their respective data and thus require less effort to rotate.

The quantity $Q(\phi)$ is then maximized by varying an angle argument $\phi$. The angle argument $\phi$ that maximizes the quantity $Q(\phi)$ is, in turn, designated as an optimum rotation angle $\theta$ for the pair of vectors $V'^{<p>}$ and $V'^{<q>}$. Once the optimum rotation angle $\theta$ is found, the pair of vectors $V'^{<p>}$ and $V'^{<q>}$ are replaced by a new, rotated pair of vectors $V'^{<p>}$ and $V'^{<q>}$ given by the Givens rotation defined by equations (9c), (9d), (9e) and (9f) using the optimum rotation angle $\theta$.

$$\alpha = V'^{<p>} \tag{9c}$$

$$\beta = V'^{<q>} \tag{9d}$$

$$V'^{<p>} = \alpha \cos(\theta) - \beta \sin(\theta) \tag{9e}$$

$$V'^{<q>} = \alpha \sin(\theta) + \beta \cos(\theta) \tag{9f}$$

Once it is determined that further selection 132 and rotation 134 produces negligible improvement, the repetitive selection 132 and rotation 134 is halted and a rotated reduced principal components matrix is the result.

Conducting 130 PP further comprises discarding 136 columns of the rotated reduced principal components matrix that make a negligible contribution to discrimination between the classes. The negligible columns of the rotated reduced principal components matrix are dropped or discarded 136 resulting in a further reduced principal components matrix V". The further reduced principal components matrix V" is of lower dimension that the reduced principal components matrix V'. One skilled in the art can readily construct a similar procedure for use with a multivariate objective function.

After doing the rotations as described hereinabove for combinations of axes designated by different p's and q's, the quantity $Q(\phi)$ is automatically sorted from high to low. In other words, the quantity $Q(\phi)$ for p equal to one is greater than the quantity $Q(\phi)$ for p equal to two, and so on. Thus, the negligible columns, those for which the quantity $Q(\phi)$ is small, are easily identified.

The objective function of conducting 130 PP can be any metric or gauge that allows the separation between the classes represented in the training set data to be quantified. For example, the objective function could be a metric based on the sum of the squares of the differences of the means of the classes or other deterministic metric. Alternatively, a statistical metric such as the Bhattacharyya distance can be used.

In a preferred embodiment, the objective function (i.e., the function $f(\cdot)$ in equation 9a) is a deterministic metric that is given by equations (10a) and (10b).

$$f = \frac{\text{trace}(R)}{\text{trace}(C_g)} \tag{10a}$$

$$R = C_b + (m_g - m_b) \cdot (m_g - m_b)^T \tag{10b}$$

where the trace($\cdot$) of a matrix is the sum of the diagonal elements of the matrix. In an alternate embodiment, the objective function is given by equations (11) and (10b).

$$f = \frac{\det(R)}{\det(C_g)} \tag{11}$$

However, the alternate embodiment of equation (11) is relatively susceptible to ill-conditioned data due to the use of the det($\cdot$) function. In yet another embodiment, the Kullback-Leibler number (as described in Charles W. Therrien, *Decision Estimation and Classification*, John Wiley and Sons, New York, 1989, pp. 140–143, incorporated herein by reference) can be used as the objective function. However, experiments performed to compare the objective function of equations (10a) and (10b) and the use of the Kullback-Leibler number as the objective function found that the objective function of equations (10a) and (10b) gave equivalent results to the Kullback-Leibler number. Since the objective function of equations (10a) and (10b) is considerably simpler than the Kullback-Leibler number, the objective function of equations (10a) and (10b) generally is preferred in most applications.

The Bhattacharyya distance is another separability measure or a metric of a theoretical distance between two Gaussian distributions. The distance separability measure is equivalent to an upper bound on the optimal Bayesian classification error probability. Also, the Bhattacharyya distance has the desirable properties of being computationally simple and extensible to more multiple Gaussian distributions. In addition, the Bhattacharyya distance is derived from an error bound instead of an exact solution so that the Bhattacharyya distance provides a 'smoothed' distance between the classes, thereby enabling the Bhattacharyya distance to work well for distributions that are only approximately Gaussian. The Bhattacharyya distance $D_{bhat}$ for the case of two classes, such as good and bad, is given by equation (12)

$$D_{bhat} = \frac{1}{8}(M_2 - M_1)^T \left[\frac{\sum_1 + \sum_2}{2}\right]^{-1} (M_2 - M_1) + \frac{1}{2}\ln\left(\frac{\left|\frac{\sum_1 + \sum_2}{2}\right|}{\sqrt{|\sum_1||\sum_2|}}\right) \tag{12}$$

where $M_1$ and $M_2$ are the vector means of the classes, and $\Sigma_1$ and $\Sigma_2$ are the covariance matrices of the classes. The first term of equation (12) quantifies the class separation in terms of the class means, while the second term quantifies the differences between the classes in terms of their respective covariance matrices. The means and covariance matrices for the two classes are extracted from the upper and lower submatrices G" and B" of the modified matrix C' for the example of a training set with good and bad objects discussed hereinabove. In the preferred embodiment (i.e., 1-dimensional case), the vector means $M_1$ and $M_2$ are simply the mean values $\mu_1$ and $\mu_2$ of the first and second vectors of the selected pair. Likewise in the preferred embodiment, the covariance matrices $\Sigma_1$ and $\Sigma_2$ are simply the square of the standard deviations $\sigma_1$ and $\sigma_2$ of the first and second select vectors, respectively.

Referring again to FIG. 1, the method 100 of classification further comprises estimating 140 the distribution density of the classes of the good and bad objects in the low-dimensional space found in conducting 130 PP. The mean and covariance of the good object distribution are computed. Similarly, the mean and covariance of the bad object distribution are computed. One skilled in the art would readily recognize that more complex distributions could be used, including but not limited to, the Gaussian mixture models of Cluster Weighting. For example, a discussion of Cluster Weighting can be found in Neil Gershenfeld, *The Nature of Mathematical Modeling*, Cambridge University Press (UK), 1999, pp. 174–185, incorporated herein by reference.

The method 100 of classification further comprises evaluating 150 an unknown object with respect to the training data. Evaluating 150 transforms and projects measured data for an unknown object being classified in a manner identical to what was done with the training data in steps 110 through 140. The class membership of the unknown object is then inferred from its probability of being in each of the classes, for example, good or bad.

Figure 4:
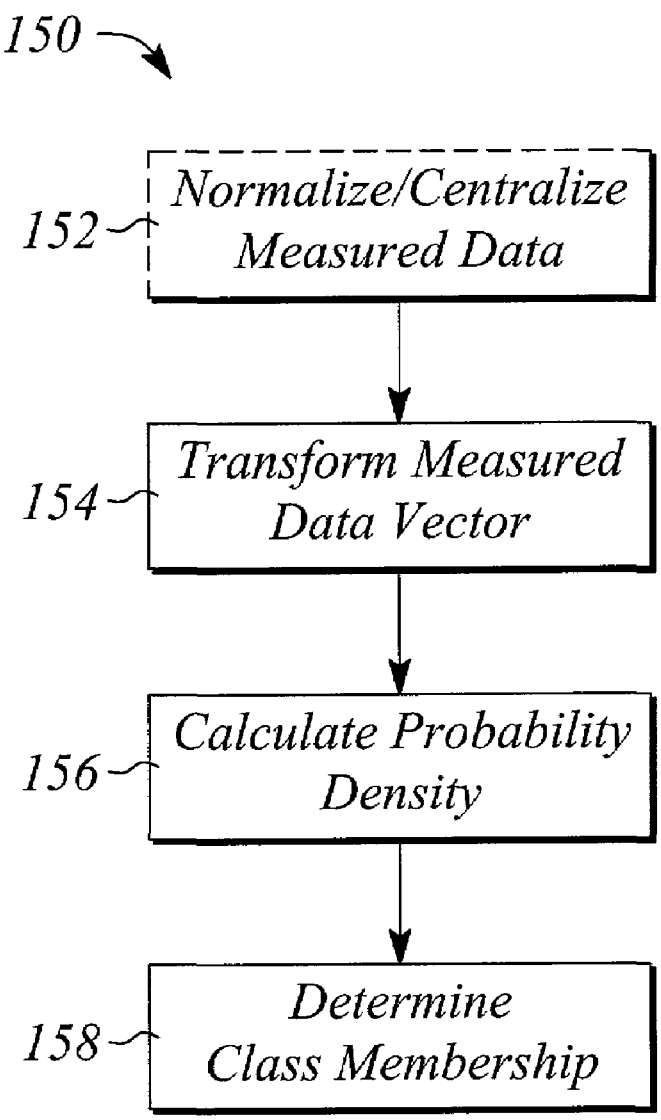
FIG. 4 illustrates a flow chart of an embodiment of evaluating an unknown object of the method of classifying illustrated in FIG. 1.

FIG. 4 illustrates a flow chart of evaluating 150 the unknown object according to the preferred embodiment. In the preferred embodiment, evaluating 150 comprises normalizing and centralizing 152 the measured feature data for the unknown object. Normalizing and centralizing 152 performs the same operations on measured feature data for the unknown object as was performed on the training set data in the optional normalizing and centralizing 110, described above. Thus, normalizing and centralizing 152 is only performed if the optional normalizing and centralizing 110 was performed on the training set data.

As with the training set data, normalizing and centralizing 152 preferably involves spherizing the data and thus creates a vector A' by subtracting a mean value from each element $A_j$ in a vector A of the measured data for the unknown object. Each element $A_j$ is then divided by a standard deviation. The mean is the value mean $<j>$ and the standard deviation is the value sdev $<j>$ that was computed in the optional normalizing and centralizing 110, where j refers to the j-th feature. Normalizing and centralizing 152 the vector A having n elements $A_j$, where j=1, . . . , n is given by equation (13)

$$A'_j = \frac{(A_j - \text{mean} < j >)}{\text{sdev} < j >} \quad (13)$$

Again, as with normalizing and centralizing 110, normalizing and centralizing 152 is optional, but preferred, and is illustrated with a dashed line box in FIG. 4 for that reason. Note, if normalizing and centralizing 110 is performed on the training data, normalizing and centralizing 152 must be performed on the vector A such that the unknown object data is normalized and centralized in a manner consistent with the training set data to which it will later be compared.

Evaluating 150 the unknown object further comprises transforming 154 the vector A' by the transformation used in performing 120 PCA and conducting 130 PP. Advantageously, transforming 154 comprises multiplying the vector A' by the matrix V". Since the matrix V" includes all the effects of performing 120 PCA and conducting 130 PP, the multiplication produces the desired transformed 154 matrix A" (i.e., A"=A'V").

Evaluating 150 the unknown object still further comprises calculating 156 the probability density of the feature data for the unknown object represented in the rotated vector A". Preferably, calculating 156 uses the estimation model of estimating 140 class distribution. Evaluating 150 still further comprises determining 158 class membership. Preferably, determining 158 uses Bayes' Theorem. Bayes' Theorem is well known in the art as a way of reversing the direction of probabilistic (i.e., conditional) statements and is given by equation (14)

$$P(a|b) = \frac{P(b|a)P(a)}{P(b)} \quad (14)$$

In essence, Bayes' Theorem states that the probability of a, given that b has occurred, is equal to the probability of b, given that a has occurred, times the a priori probability of a occurring, divided by the a priori probability of b occurring.

Advantageously, steps 120 through 140 of the method 100 need only be performed once for each classification task (i.e., for each training set). The results of steps 120 through 140 are used for any subsequent unknown object classification task by repeating only the evaluation 150 for the subsequent unknown object.

Figure 5:
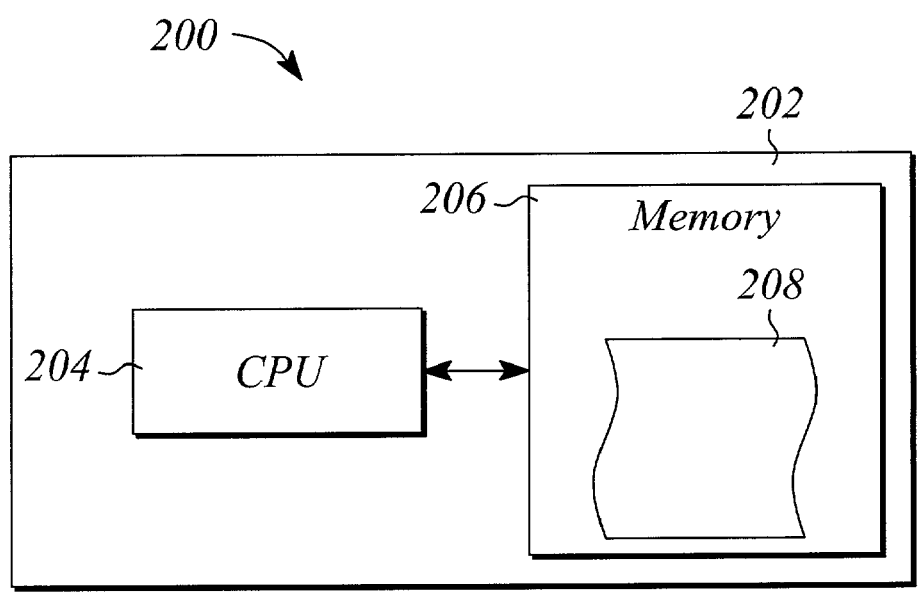
FIG. 5 illustrates a block diagram of a system for classifying an object according to an embodiment of the present invention.

In another aspect of the invention, an object identification system 200 is provided. The object identification system 200 classifies objects as being a member of a class using measurements taken from the object or from an image of the object. For example, the system 200 could be a portion of an automated inspection system that classifies inspected objects as either 'good' or 'bad'. An embodiment of the identification system 200 is illustrated in FIG. 5 and comprises a computer 202 having a central processing unit (CPU) 204 and computer memory 206. A computer program 208 is stored in the computer memory 206. The computer program 208 preferably comprises instructions that implement the method 100, as described above, and can be stored as either firmware or software. The measured training set data produced from measurements on the training set of objects are stored in the memory 206. Once the training data set has been processed according to steps 120 through 140 (and optionally step 110) of the method 100, the results also can be stored in the memory 206 for use later in evaluating 150 an unknown object. Given the discussion hereinabove including equations (1) through (14), one skilled in the art could readily construct just such a computer program without undue experimentation. Examples of inspection systems that might employ the system 200 include but are not limited to an X-ray Laminography based Automated Solder Joint Inspection System.

Thus, there has been described a novel method 100 of object classification and an object identification system 200 that implements the method 100. It should be understood that the above-described embodiments are merely illustrative of the some of the many specific embodiments that represent the principles of the present invention. Clearly, those skilled in the art can readily devise numerous other arrangements without departing from the scope of the present invention.

What is claimed is:

1. A method of classifying an unknown object as being a member of one of a plurality of classes, each of the classes being defined by feature data for a training set of known objects, each known object of the set having known class membership, the method comprising:

performing principal component analysis of the feature data to discard features having negligible information regarding class membership to produce a reduced feature data set;

conducting supervised projection pursuit on the reduced feature data set to accentuate differences between the classes as represented by the reduced feature data set to produce a further reduced feature data set;

estimating a distribution of the further reduced feature data set for each of the classes represented in the training set; and evaluating measured feature data of the unknown object to determine membership in one of the classes.

2. The method of claim 1, further comprising optionally nonnalizing and centralizing the feature data before performing principal component analysis, wherein normalizing and centralizing comprises:

computing a mean value and a standard deviation value of the feature data for each feature of the objects of the training set; and spherizing the feature data for each object using the respective mean value and the respective standard deviation value for each feature, wherein the respective mean value is the avenge of all feature data corresponding to a particular feature of all objects in the training set, and wherein the respective standard deviation is computed for all feature data corresponding to the particular feature of all objects in the training set.

3. The method of claim 2, wherein spherizing the feature data comprises:

subtracting the respective feature mean value from the respective feature data for each object of the training set; and dividing the respective feature data for each object by the respective feature standard deviation value.

4. The method of claim 1, wherein in performing principal component analysis, the feature data are represented by matrices, one matrix for each class in the training set, the matrices having one column for each feature and one row for each known object in the training set, and wherein performing principal component analysis comprises:

stacking the matrices of the feature data of the training set to create a combined matrix;

finding a principal components matrix for the combined matrix; and discarding columns from the principal components matrix that have negligible information to form a reduced principal components matrix.

5. The method of claim 4, wherein finding a principal components matrix comprises finding a singular value decomposition of the combined matrix, and wherein in discarding columns from the principal components matrix, the discarded columns are columns having negligible singular values.

6. The method of claim 4, wherein conducting supervised projection pursuit (PP) comprises:

selecting a pair of columns from the reduced principal components matrix; and rotating the selected column pair to find an angle that maximizes an objective function, to form a rotated reduced principal components matrix.

7. The method of claim 6, wherein conducing PP further comprises:

discarding negligible columns of the rotated reduced principal components matrix to form a further reduced principal components matrix.

8. The method of claim 6, wherein in rotating the selected column pair, the column pair rotation is a givens rotation.

9. The method of claim 6, wherein in rotating the selected column pair, the objective function is a 1-dimensional Bhattacharyya distance.

10. The method of claim 6, wherein in rotating the selected column pair, the objective function is given by equations (10a) and (10b), $$f = \frac{\text{trace}(R)}{\text{trace}(C_g)} \quad (10a)$$

where $$R = C_b + (m_g - m_b) \cdot (m_g - m_b)^T \quad (10b)$$

and where $m_g$ is a column mean of the training set data representing a first class of the plurality of classes, $m_b$ is a column mean of the training set data representing a second class of the plurality, $C_g$ and $C_b$ are covariance matrices of the training set data representing the first class and the second class, respectively.

11. The method of claim 1, wherein estimating a distribution comprises computing a mean and a covariance for each feature of the further reduced feature data set for each of the classes.

12. The method of claim 1, wherein evaluating measured feature data of the unknown object comprises:

transforming the measured feature data of the unknown object to remove measurements that have a negligible effect on classification;

calculating a probability density for the transformed measured feature data of the unknown object; and determining class membership for the unknown object by comparing the transformed measured feature data to the probability density of the class distributions of the training set.

13. The method of claim 2, wherein evaluating measured feature data of the unknown object comprises optionally normalizing and centralizing the measured feature data of the unknown object using the computed feature mean values and the feature standard deviation values of the training set.

14. The method of claim 13, wherein optional normalizing and centralizing the measured feature data of the unknown object comprises spherizing the measured feature data, wherein spherizing the measured feature data comprises:

subtracting the respective feature mean value of the training set from a respective measured feature data value of the unknown object; and dividing each respective measured feature data value of the unknown object by the respective feature standard deviation value of the training set.

15. The method of claim 4, wherein evaluating measured feature data of the unknown object comprises transforming the measured feature data of the unknown object to remove features that have negligible effect on the classification, wherein transforming comprises multiplying the measured feature data of the unknown object by the reduced principal components matrix obtained from discarding columns from the principal components matrix for the training set data.

16. The method of claim 7, wherein evaluating measured feature data of the unknown object comprises transforming the measured feature data of the unknown object to remove features that have negligible effect on the classification, wherein transforming comprises multiplying the measured feature data of the unknown object by the further reduced principal components matrix obtained from discarding negligible columns of the rotated reduced principal components matrix for the training set data.

17. The method of claim 3, wherein in performing principal component analysis, the spherized data values are represented in the form of matrices, one matrix for each class, the matrices having one column for each measurement and one row for each member of the class in the training set, performing principal component analysis comprises:
   stacking the matrices of the spherized data values to create a combined matrix;
   finding a singular value decomposition (SVD) of the combined matrix to produce a principal component matrix; and
   discarding columns from the principal component matrix to produce a reduced principal component matrix, the discarded columns having negligible singular values.

18. The method of claim 17, wherein conducting supervised projection pursuit comprises:
   selecting a pair of columns from the reduced principal components matrix; and
   rotating the selected column pair to find an optimum angle that maximizes an objective function, to form a rotated reduced principal components matrix.

19. The method of claim 18, wherein in rotating the selected column pair, the selected column pair rotation is a Givens rotation.

20. The method of claim 18, wherein in rotating the selected column pair, the objective function is given by equations (10a) and (10b)

$$f = \frac{\text{trace}(R)}{\text{trace}(C_g)} \qquad (10a)$$

wherein $$R = C_b + (m_g - m_b) \cdot (m_g - m_b)^T \qquad (10b)$$

and wherein $m_g$ is a column mean of the training set data representing a first class of the plurality of classes, $m_b$ is a column mean of the training set data representing a second class of the plurality, $C_g$ and $C_b$ are covariance matrices of the training set data representing the first class and the second class, respectively.

21. The method of claim 18, wherein evaluating measured feature data of the unknown object comprises:
   optionally normalizing and centralizing measured data of the unknown object;
   transforming the measured data of the unknown object to remove measurements that have a negligible effect on the classification;
   calculating a probability density for the transformed measured data of the unknown object; and
   determining class membership for the unknown object by comparing the probability density of the transformed measured feature data to the distributions of the classes of the training set.

22. A system for classifying objects comprising:
   a computer that performs numerical processing;
   a memory that stores data and intermediate results; and
   a computer program stored in the memory, the computer program comprising instructions that, when executed by the computer, implement optionally normalizing and centralizing feature data values from a training set of known objects, performing principal component analysis of the feature data values to discard features that have negligible information regarding class membership, conducting supervised projection pursuit on remaining feature data values to accentuate differences between classes, estimating a distribution of each accentuated class represented in the training set, and evaluating feature measurements of an unknown object to determine membership in one of the accentuated classes.

23. The system of claim 22 further comprising an imaging subsystem for producing images of the known objects and the unknown object from which the feature data and the feature measurements are produced.

24. The system of claim 23, wherein the imaging subsystem is an X-Ray Laminography system.

25. The system of claim 22, wherein the system is an automated solder joint inspection system.

* * * * *